(12) United States Patent
Robert et al.

(10) Patent No.: US 12,497,175 B2
(45) Date of Patent: Dec. 16, 2025

(54) EXCHANGER ASSEMBLY COMPRISING AN INSULATING AIR GAP, AND ASSOCIATED AIR CONDITIONING SYSTEM

(71) Applicant: LIEBHERR-AEROSPACE TOULOUSE SAS, Toulouse (FR)

(72) Inventors: Julien Robert, Toulouse (FR); Stephane Meunier, Toulouse (FR)

(73) Assignee: LIEBHERR-AEROSPACE TOULOUSE SAS, Toulouse (FR)

(\*) Notice: Subject to any disclaimer, the term of this patent is extended or adjusted under 35 U.S.C. 154(b) by 708 days.

(21) Appl. No.: 17/621,611

(22) PCT Filed: Jun. 16, 2020

(86) PCT No.: PCT/FR2020/051033
§ 371 (c)(1),
(2) Date: Dec. 21, 2021

(87) PCT Pub. No.: WO2020/254754
PCT Pub. Date: Dec. 24, 2020

(65) Prior Publication Data
US 2022/0355937 A1    Nov. 10, 2022

(30) Foreign Application Priority Data
Jun. 21, 2019 (FR) ..................................... 1906743

(51) Int. Cl.
*B64D 13/02* (2006.01)
*F28F 13/06* (2006.01)

(52) U.S. Cl.
CPC .............. *B64D 13/02* (2013.01); *F28F 13/06* (2013.01)

(58) Field of Classification Search
CPC ................... B64D 13/02; B64D 13/08; B64D 2013/0618; F28F 13/06
(Continued)

(56) References Cited

U.S. PATENT DOCUMENTS 2,505,790 A * 5/1950 Panthofer ................ F01P 11/08
165/149
4,138,857 A    2/1979 Dankowski
(Continued)

FOREIGN PATENT DOCUMENTS

GB            2015723 A *  9/1979 ............... B60H 1/32

*Primary Examiner* — Tho V Duong
(74) *Attorney, Agent, or Firm* — CRGO Global; Steven M. Greenberg

(57) ABSTRACT

Heat exchanger assembly comprising a ram air flow channel (14) extending in a longitudinal direction, and characterized in that said assembly comprises: at least two separate heat exchangers (12a, 12b) that are adjacent in a transverse direction perpendicular to the longitudinal direction, are arranged in the ram air flow channel (14), and are configured such that the ram air passing through said channel (14) forms a cold pass of each heat exchanger (12a, 12b) by passing through said heat exchanger (12a, 12b) in said longitudinal direction, each heat exchanger (12a, 12b) also being configured for the passage therethrough of a fluid that is intended to be cooled and that forms a hot pass (20a, 20b); and an air passage which is provided between the heat exchangers and forms a thermally insulating air gap (18) between said exchangers (12a, 12b), and through which the ram air flows, said air passage extending in said longitudinal direction of said ram air flow channel (14).

6 Claims, 2 Drawing Sheets

(58) Field of Classification Search
USPC .................................................. 165/135, 136
See application file for complete search history.

(56) References Cited

U.S. PATENT DOCUMENTS

| | | | |
|---|---|---|---|
| 4,209,993 A | | 7/1980 | Rannenberg |
| 4,651,816 A | * | 3/1987 | Struss .................... F28D 1/0452 |
| | | | 165/76 |
| 5,706,683 A | * | 1/1998 | Napier .................... E05B 19/00 |
| | | | 70/393 |
| 6,394,176 B1 | * | 5/2002 | Marsais .................. F25B 39/04 |
| | | | 165/135 |
| 7,490,659 B2 | * | 2/2009 | Kwon .................... F28F 9/0209 |
| | | | 165/149 |
| 2003/0177780 A1 | | 9/2003 | Brutscher et al. |
| 2005/0072561 A1 | * | 4/2005 | Ozaki ..................... F28F 9/001 |
| | | | 165/140 |
| 2011/0232865 A1 | | 9/2011 | Mildner |
| 2014/0260340 A1 | | 9/2014 | Vaisman et al. |

\* cited by examiner

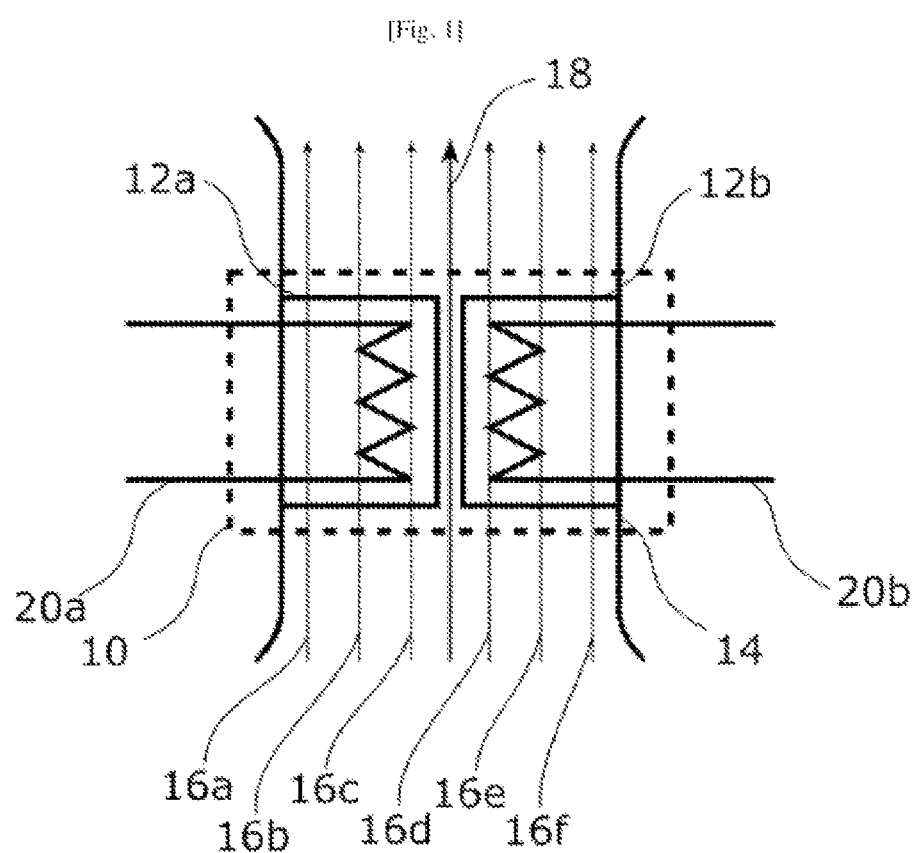

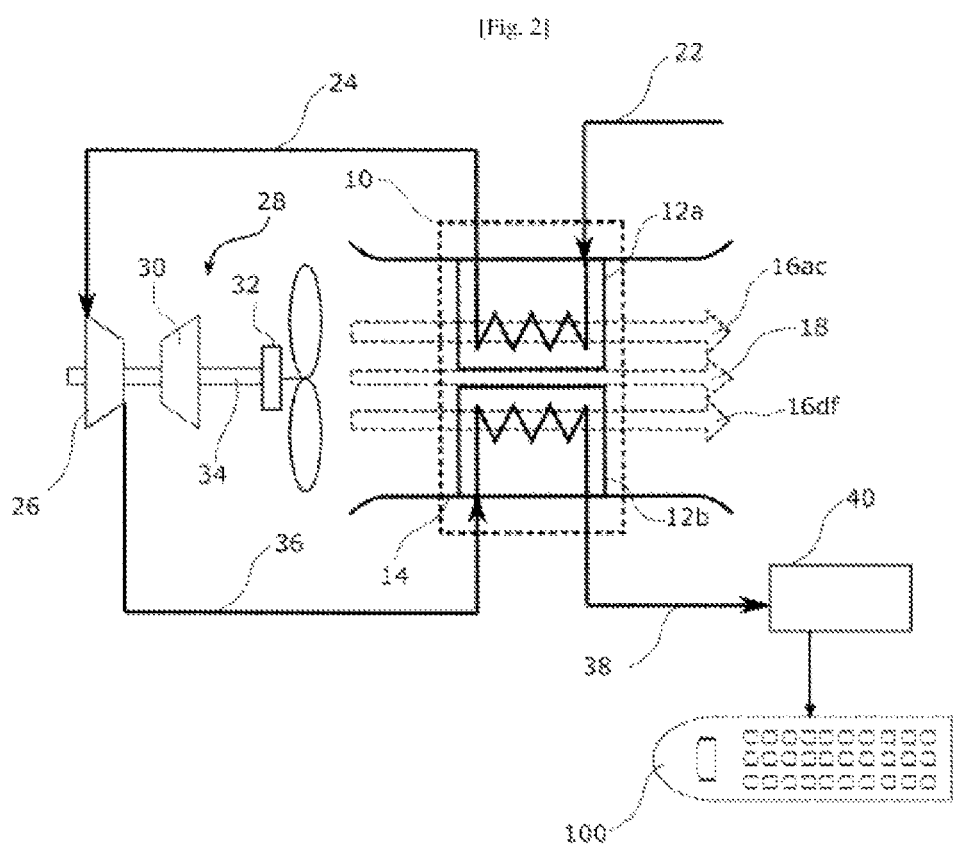

EXCHANGER ASSEMBLY COMPRISING AN INSULATING AIR GAP, AND ASSOCIATED AIR CONDITIONING SYSTEM

CROSS-REFERENCE TO RELATED APPLICATIONS

This application is a § 371 national phase entry of International Application No. PCT/FR2020/051033, filed Jun. 16, 2020, which claims priority to French Patent Application No. 1906743, filed Jun. 21, 2019.

TECHNICAL FIELD OF THE INVENTION

The invention relates to a heat exchanger assembly. In particular, the invention relates to a heat exchanger assembly that can be used in an air conditioning system for an aircraft.

TECHNOLOGICAL BACKGROUND

Air conditioning systems or other systems based on a plurality of heat exchanges between different fluids comprise a plurality of heat exchangers for these heat exchanges.

In particular, in an air conditioning system for an aircraft, a plurality of heat exchangers can be used to cool fluids such as oil or air, etc., by means of ram air, which is generally ambient air collected from outside the aircraft and moved by a fan. The fan is, for example, driven by a motor or by the shaft of a turbine engine, in particular by the shaft of a turbine engine of the air conditioning system.

This ram air source allows efficient cooling of the fluids to be cooled.

In the current designs of air conditioning systems, there are either independent exchangers or exchangers grouped together by an exchanger assembly.

The exchanger assemblies allow a reduction in size and simplified maintenance, the exchangers all being arranged in close proximity.

However, this bringing together of exchangers leads to disadvantages, in particular thermal disadvantages: the proximity of the exchangers can lead to the formation of thermal bridges, that is to say the transmission of heat from one exchanger to another.

These thermal bridges must be avoided at all costs because they can cause disruptions in the heat exchanges, in particular if one heat exchanger treats a fluid of a much higher temperature than the other heat exchanger.

AIMS OF THE INVENTION

The invention thus aims to provide a heat exchanger assembly in which the heat exchangers have a close proximity or close environment.

The invention aims in particular to provide a heat exchanger assembly that prevents thermal bridges between the heat exchangers.

The invention also aims to provide a heat exchanger assembly that can be used in an air conditioning system of an aircraft.

DISCLOSURE OF THE INVENTION

To this end, the invention relates to a heat exchanger assembly comprising a ram air flow channel extending in a longitudinal direction, and characterized in that said assembly comprises:

at least two separate heat exchangers that are adjacent in a transverse direction perpendicular to the longitudinal direction, are arranged in the ram air flow channel, and are configured such that the ram air passing through said channel forms a cold pass of each heat exchanger by passing through said heat exchanger in said longitudinal direction, each heat exchanger also being configured for the passage therethrough of a fluid that is intended to be cooled and that forms a hot pass; and an air passage which is provided between the heat exchangers and forms a thermally insulating air gap between said exchangers, and through which the ram air flows, said air passage extending in said longitudinal direction of said ram air flow channel.

A heat exchanger assembly according to the invention thus makes it possible to group together at least two heat exchangers using the ram air as a cold pass that is common to the heat exchangers, while preventing thermal bridges between the heat exchangers.

In particular, the arrangement of the exchangers in the longitudinal direction, which is the direction of flow of the ram air in the channel, allows the heat exchangers to be fed by a cold pass formed by the ram air.

The air passage provides thermal insulation between the different exchangers. Since the ram air flow takes place in the longitudinal direction, the air flowing through this insulating air passage does not come into contact with the exchangers but merely forms the insulating air gap in the space formed by the distance from the exchangers. Thus, heat is not transmitted from one exchanger to another and, in particular, ram air which would have been heated by passing through a heat exchanger does not then flow through another heat exchanger.

The ram air thus performs a dual function: of cooling by means of the cold pass in each exchanger, and of insulation between the heat exchangers.

Advantageously and according to the invention, at least two heat exchangers of the exchangers of the assembly are produced in the same mold.

According to this alternative, producing the exchanger assembly in the same mold allows the production process to be simplified and costs to be reduced.

In addition, it makes it possible to create the air passage directly during the production of the exchangers. Thus, the air passage is preformed between the heat exchangers during production, and this prevents said passage from having to be formed during the installation of the exchangers of the assembly, for example in an air conditioning system of an aircraft.

Advantageously and according to the invention, the fluid forming the hot pass of each exchanger is air.

According to this alternative of the invention, the heat exchangers are of the air/air type and are particularly suitable for air cooling and conditioning, in particular in an air conditioning system for an aircraft. The air treated by the two exchangers is either different, or air coming from the same source but having undergone a treatment between the two heat exchangers (for example compression, expansion, heating or cooling, etc., or a combination of a plurality of treatments, for example by passing through a compressor or a turbine).

According to other alternatives of the invention, the fluid forming the hot pass is another type of fluid, for example oil or a coolant, etc. Each heat exchanger can treat a fluid of a different nature than that of the other heat exchanger.

Advantageously and according to the invention, the distance between the two exchangers, in the transverse direction, is between 1 mm and 10 mm, preferably between 3 mm and 6 mm.

These distances make it possible both to ensure a minimum spacing between the heat exchangers in order to allow thermal insulation between the two heat exchangers, and at the same time to have a sufficiently small space for a limited overall size of the exchanger assembly in the ram air flow channel.

The invention also relates to an air conditioning system that is characterized in that it comprises a heat exchanger assembly according to the invention.

An air conditioning system according to the invention makes it possible to bring together two exchangers in close proximity without, however, leading to thermal bridges which would be detrimental to their efficiency.

Advantageously and according to the invention, a first exchanger of the assembly forms a primary exchanger of the air conditioning system, cooling the intake air and transmitting the air thus cooled to an inlet of a compressor of the air conditioning system, and a second exchanger of the assembly forms a main exchanger of the air conditioning system, cooling the air leaving said compressor.

According to this aspect of the invention, the primary heat exchanger and the main heat exchanger can operate without a thermal bridge. In particular, the heat released during passage through one of the exchangers is never transmitted to the other exchanger by the ram air, the operation of the two exchangers being independent.

According to other alternatives of the invention, the exchanger assembly can be used in other types of air conditioning system designs; in particular, the exchangers can be used to cool other types of air upstream or downstream of the compressor, or other fluids, for example engine oil.

Advantageously and according to the invention, the air conditioning system comprises a turbine engine comprising a transmission shaft, said transmission shaft being rotated by the turbine engine and driving a fan configured to supply the ram air passing through the ram air flow channel. The ram air thus consists of the ram air moved by the fan of the turbine engine.

The invention also relates to an aircraft comprising an air conditioning system according to the invention.

The invention also relates to a heat exchanger assembly, an air conditioning system and an aircraft that are characterized in combination by all or some of the features mentioned above or below.

LIST OF FIGURES

Further aims, features and advantages of the invention will become apparent upon reading the following description, which is provided solely by way of non-limiting example, and which refers to the accompanying figures, in which:

FIG. 1 is a schematic perspective view of a heat exchanger assembly according to one embodiment of the invention; and FIG. 2 is a schematic simplified view of an air conditioning system according to one embodiment of the invention.

DETAILED DESCRIPTION OF ONE EMBODIMENT OF THE INVENTION

For the sake of illustration and clarity, scales and proportions are not strictly adhered to in the figures.

Moreover, identical, similar or analogous elements are denoted using the same reference signs throughout the figures.

FIG. 1 illustrates a heat exchanger assembly 10 according to one embodiment of the invention.

The heat exchanger comprises at least two adjacent heat exchangers, in this case a first heat exchanger 12a and a second heat exchanger 12b, which exchangers are arranged in a ram air flow channel 14. The exchangers are advantageously produced in the same mold.

The ram air flow channel 14 extends in a longitudinal direction, which corresponds to the direction of flow of the ram air passing through said channel 14, as shown schematically by arrows 16a to 16f and arrow 18, which represent the flow of the ram air through the channel 14.

The heat exchangers 12a, 12b are thus adjacent in a transverse direction (not shown) perpendicular to the longitudinal direction.

The ram air forms a cold pass of each of the heat exchangers. In the schematic form of FIG. 1, a first part of the ram air represented by the arrows 16a, 16b, 16c forms the cold pass of the first heat exchanger 12a, and a second part of the ram air represented by the arrows 16d, 16e, 16f forms the cold pass of the second heat exchanger 12b.

This ram air forming the cold pass of the heat exchangers 12a, 12b allows a fluid forming a hot pass of each exchanger to be cooled: the first heat exchanger 12a comprises a first circuit 20a for the flow of a first fluid forming a hot pass of said first heat exchanger 12a, and second heat exchanger 12b comprises a second circuit 20b for the flow of a second fluid forming a hot pass of said second heat exchanger 12b.

The distance between the heat exchangers 12a, 12b allows an air passage to be formed between the heat exchangers, forming, when the ram air passes therethrough, a thermally insulating air gap 18 between said exchangers. The arrow representing the ram air gap 18 is thicker than the arrows 16a to 16f only for reasons of clarity, and the thickness of said arrow does not presume any particular characteristic of the ram air forming the air gap 18 relative to the ram air forming a cold pass of the heat exchangers 12a, 12b.

The presence of the air gap 18 makes it possible to prevent thermal bridges between the heat exchangers 12a and 12b, that is to say the transmission of heat from one heat exchanger to another. When the two fluids forming the hot pass of one and the other of the exchangers have very different temperatures, the thermal bridges could cause the exchangers to malfunction, in particular the coldest fluid could be heated by the ram air cooling the hottest fluid. Thus, the thermally insulating air gap 18 makes it possible to ensure correct operation of the two heat exchangers 12a, 12b.

The heat exchanger assembly 10 is particularly suitable for use in an air conditioning system for an aircraft, one embodiment of which is shown with reference to FIG. 2.

The heat exchanger assembly 10 comprises, in the same way as above, two heat exchangers 12a and 12b arranged in the ram air flow channel 14. The ram air forms a first cold pass 16ac of the first heat exchanger 12a (corresponding to the arrows 16a to 16c in FIG. 1), and a second cold pass 16df of the second heat exchanger 12b (corresponding to the arrows 16d to 16f of FIG. 1). The insulating blade 18 passes through the channel 14 between the two heat exchangers 12a, 12b in the longitudinal direction.

In this embodiment, the first exchanger 12a is a primary heat exchanger, often referred to as a PHX. The first exchanger 12a receives air 22 that is bled, for example, from the engines of the aircraft or taken in from outside the aircraft and then compressed. This intake air 22 forms the hot pass of the first exchanger 12a.

The air 24 cooled in the first exchanger is transmitted to the compressor 26 of a turbine engine 28, in order to be compressed therein. The turbine engine 28 further comprises a turbine 30, and a fan 32, both connected to each other and to the compressor by a transmission shaft 34. The turbine engine 28 can also comprise an electric motor (not shown), to form a motorized turbine engine.

The air 36 compressed by the compressor 26 forms the hot pass of the second heat exchanger 12b. The second heat exchanger 12b thus forms a main heat exchanger, often referred to as an MHX.

The air 38 cooled by the second heat exchanger 12b is transmitted to the air conditioning pack 40 which treats this air in order for said air to be conditioned before being transmitted to a cabin 100 of the aircraft. In particular, this treatment by the air conditioning pack 40 can comprise passage through the turbine 30 for air expansion and cooling, thus supplying energy to the turbine engine 28 for the rotation thereof.

The rotation of the transmission shaft 34 of the turbine engine, due to the recovery of energy by the turbine 30, by an electric motor or by any other means, operates the fan 32, allowing the formation of the ram air forming both the cold passes 16ac, 16df of the heat exchangers 12a, 12b, and at the same time the thermally insulating air gap 18.

The invention claimed is:

1. An air conditioning system for an aircraft, wherein said system comprises a heat exchanger assembly comprising:
    a ram air flow channel extending in a longitudinal direction;
    at least two separate heat exchangers that are adjacent in a transverse direction perpendicular to the longitudinal direction, are arranged in the ram air flow channel, extend principally in said longitudinal direction, and are configured such that the ram air passing through said channel forms a cold pass of each heat exchanger by passing through said heat exchanger in said longitudinal direction, each heat exchanger also being configured for the passage therethrough of a fluid that is intended to be cooled and that forms a hot pass; and
    an air passage which is provided between the heat exchangers and forms a thermally insulating air gap between said exchangers, and through which the ram air flows, said air passage extending principally in said longitudinal direction of said ram air flow channel, wherein the distance between the two heat exchangers, in the transverse direction, is between 1 mm and 10 mm; and
    wherein a first exchanger of the assembly forms a primary exchanger of the air conditioning system, cooling the intake air and transmitting the air thus cooled to an inlet of a compressor of the air conditioning system, and in that a second exchanger of the assembly forms a main exchanger of the air conditioning system, cooling the air leaving said compressor.

2. The air conditioning system according to claim 1, wherein said system comprises a turbine engine comprising a transmission shaft, said transmission shaft being rotated by the turbine engine and driving a fan configured to supply the ram air passing through the ram air flow channel.

3. An aircraft, comprising an air conditioning system comprising a heat exchanger assembly comprising:
    a ram air flow channel extending in a longitudinal direction;
    at least two separate heat exchangers that are adjacent in a transverse direction perpendicular to the longitudinal direction, are arranged in the ram air flow channel, extend principally in said longitudinal direction, and are configured such that the ram air passing through said channel forms a cold pass of each heat exchanger by passing through said heat exchanger in said longitudinal direction, each heat exchanger also being configured for the passage therethrough of a fluid that is intended to be cooled and that forms a hot pass;
    an air passage which is provided between the heat exchangers and forms a thermally insulating air gap between said exchangers, and through which the ram air flows, said air passage extending in said longitudinal direction of said ram air flow channel, wherein the distance between the two heat exchangers, in the transverse direction, is between 1 mm and 10 mm; and,
    wherein a first exchanger of the assembly forms a primary exchanger of the air conditioning system, cooling the intake air and transmitting the air thus cooled to an inlet of a compressor of the air conditioning system, and in that a second exchanger of the assembly forms a main exchanger of the air conditioning system, cooling the air leaving said compressor.

4. The air conditioning system according to claim 1, wherein at least two heat exchangers of the exchangers of the assembly are produced in the same mold.

5. The air conditioning system according to claim 1, wherein the fluid forming the hot pass of each exchanger is air.

6. The air conditioning system according to claim 1, wherein the distance between the two exchangers, in the transverse direction is between 3 mm and 6 mm.

* * * * *